United States Patent [19] [11] 3,708,694
Evans [45] Jan. 2, 1973

[54] VOLTAGE LIMITER

[75] Inventor: Arthur D. Evans, Saratoga, Calif.

[73] Assignee: Siliconix Incorporated, Santa Clara, Calif.

[22] Filed: May 20, 1971

[21] Appl. No.: 145,429

[52] U.S. Cl. ....................307/237, 307/251, 307/304
[51] Int. Cl. ................................................H03k 5/08
[58] Field of Search..............307/251, 279, 304, 237; 330/38 R

[56] References Cited

UNITED STATES PATENTS

| | | | |
|---|---|---|---|
| 3,275,911 | 9/1966 | Onodera | 307/251 X |
| 3,586,883 | 6/1971 | Hayes | 307/251 |
| 3,603,811 | 9/1971 | Day et al. | 307/237 |
| 3,656,025 | 4/1972 | Roveti | 307/237 X |
| 3,363,115 | 1/1968 | Stephenson | 307/279 |
| 3,609,710 | 9/1971 | Browne | 307/279 |
| 3,369,129 | 2/1968 | Wolterman | 307/304 |
| 3,500,062 | 3/1970 | Annis | 307/251 |

*Primary Examiner*—Stanley D. Miller, Jr.
*Attorney*—Flehr, Hohbach, Test, Albritton & Herbert

[57] ABSTRACT

A voltage limiter circuit and semiconductor structure employing field effect transistors and diodes adapted to be connected between a source of signal and the input of associated apparatus to provide over-voltage protection to the apparatus.

6 Claims, 4 Drawing Figures

INVENTOR
ARTHUR D. EVANS
BY
Fleh, Hohbach, Test, Albritton & Herbert
ATTORNEYS

INVENTOR
ARTHUR D. EVANS
BY
Fleher, Hohbach, Test
Albritton & Herbert
ATTORNEYS

VOLTAGE LIMITER

BACKGROUND OF THE INVENTION

This invention relates generally to a voltage limiter circuit and more particularly to a field effect transistor structure which provide over-voltage protection to data input lines of multiplexers.

A frequently encountered problem in analog multiplexer systems is the presence of excess voltage at one or more input signal terminals. In a typical system designed to handle voltages in the order of ± 5 volt signals, an input voltage in excess of about ± 10 volts on any one input terminal will cause malfunction of that and sometimes other channels. In some applications, input voltages of ± 30 to ± 80 volts may occur due to transients, transducer malfunctions or other causes. Such voltages may result not only in malfunction but may also cause damage not only in the channel in which the over-voltage occurs but also in other channels.

One method of preventing an over-voltage from appearing at a multiplexer input is to provide a resistor in series with each input, and low leakage diodes shunting each input to plus and minus reference voltages. If the input is within the normal range of the input voltage, the diodes are reverse biased and have negligible effect upon the system performance. If the input exceeds the reference voltage, the diodes will become forward biased and limit the voltage applied to the input terminals to approximately the reference voltage plus or minus the voltage drop of the diodes.

A major disadvantage of the above method of voltage limiting is that power dissipation occurs during over-voltage conditions. For over-voltages in the order of 80 volts, power dissipation as much as 5 watts or more will occur. In typical high density multiplexers, this magnitude of power dissipation may result in excessive heating of the associated switches. The dissipation can be decreased by increasing the input resistance but this results in an increase in normal signal transmission error.

OBJECTS AND SUMMARY OF THE INVENTION

It is an object of the present invention to provide a voltage limiter circuit employing field effect devices and an integrated semiconductor structure incorporating the circuit.

It is another object of the present invention to provide a voltage limiter having low power dissipation.

It is a further object of the present invention to provide a voltage limiter which can be manufactured as an integrated circuit.

The foregoing and other objects of the invention are achieved by a voltage limiter having input and output terminals with a first field effect transistor having its source and drain electrodes connected in series between the input and output terminals, a second field effect transistor having its source and drain electrodes connected in series between the gate of the first field effect transistor and one of the other electrodes of said first field effect transistor, a diode connected between the gate terminals of said field effect transistors and a positive voltage reference source and a diode connected between the drain of said first field effect transistor and a negative voltage reference source.

DESCRIPTION OF THE PREFERRED EMBODIMENT

Figure 1:
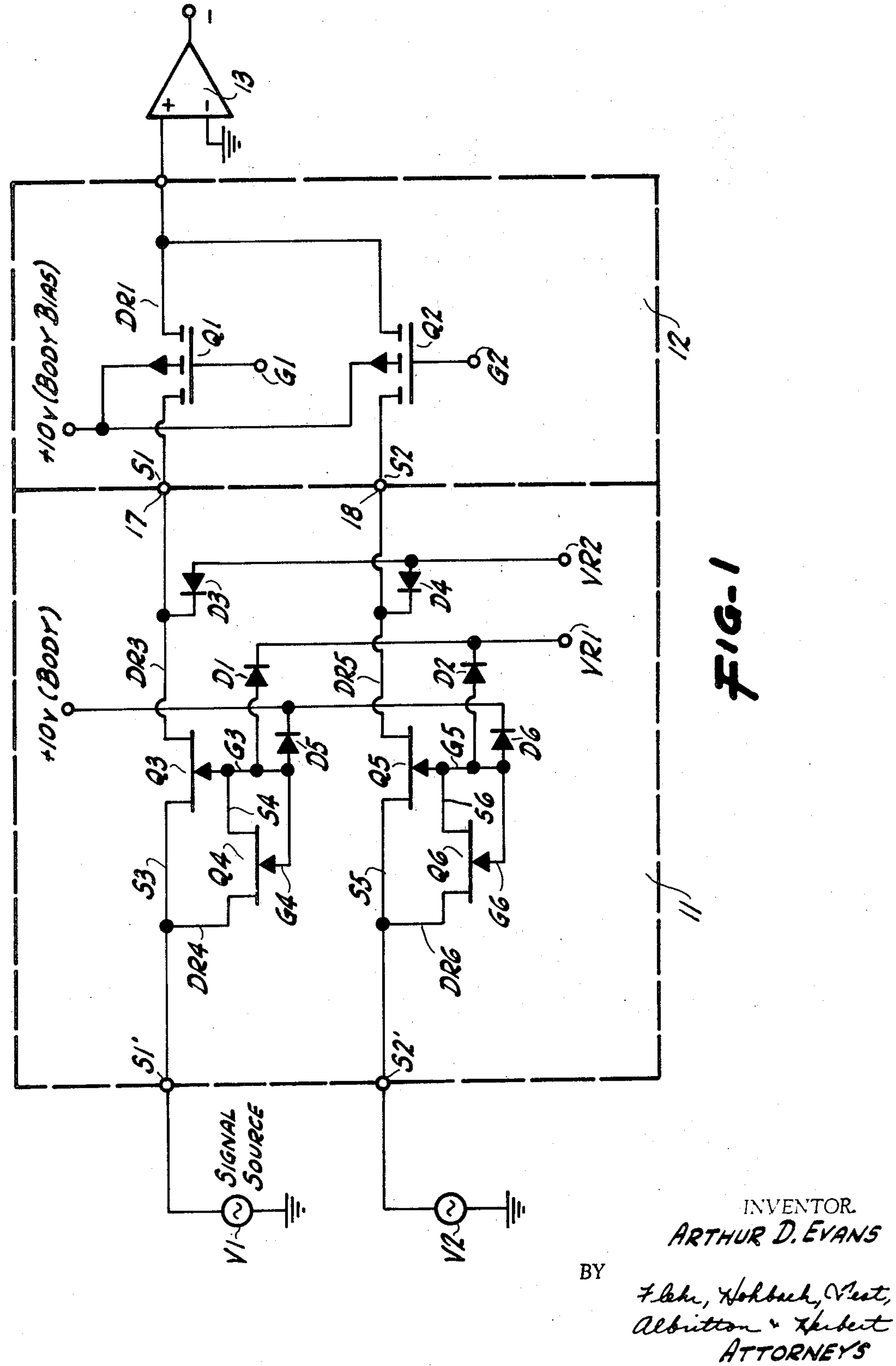
FIG. 1 is a circuit diagram of a voltage limiter employing field effect transistors and diodes in accordance with the invention.

Referring to FIG. 1, a voltage limiter circuit 11 is shown with its input terminals connected to two signal sources V1 and V2 at terminals S1' and S2'. Its output terminals are connected to terminals S1 and S2 of switching circuit 12 which serves to selectively connect the voltage sources V1 and V2 to an associated amplifier 13.

The switching circuit 12 is shown as including two channels. Usually the circuit 12 may include eight or more channels. The typical switching circuit shown employs MOS-FET's Q1 and Q2 which function as switches to either block or pass information from the associated signal source V1 and V2, respectively, to an amplifier or associated apparatus 13. If, for example, the gate G1 of MOS-FET Q1 is at +10 volts, Q1 is off, that is, the switch is open, S1 is isolated from the drain provided that the voltage at S1 does not exceed the body voltage, in the example 10 volts. If S1 exceeds 10 volts, then minority carriers are injected into the body of the MOS-FET Q1. Many of the carriers will be collected by the drain DR1 and as a result S1 is no longer isolated from the drain DR1. In the negative direction, voltage breakdown may occur between the source electrode S1 and the body or between the source electrode and the drain of the MOS-FET switch Q1. A typical maximum rating for these parameters is −30 volts. This means, for the example under discussion, that the source or input terminal V1 should not be permitted to go more negative than −20 volts nor more positive than +10.5 volts or the switch will not function to isolate the drain DR1 from the terminal S1. As previously described, in the prior art oppositely poled diodes were connected between the input terminal S1, S2, etc., and reference voltage sources to limit the voltages appearing at the terminals.

In accordance with the present invention, there is provided a field effect transistor voltage limiter circuit 11 which serves to limit the voltages applied to the terminals S1, S2 and which has small power dissipation under overload conditions.

The two-channel circuit shown includes junction field effect transistors Q3 and Q5 with their sources connected to the input terminals S1' and S2', respectively, and their drains DR3 and DR5 connected to the output terminals 17 and 18. Second field effect transistors Q4 and Q6 have their drain terminals connected to the source terminals S3 and S5 of transistors Q3 and Q5 and their source terminals S4 and S6 connected to the gate terminals G3 and G5 of transistors Q3 and Q5. The gates G4 and G6 of the junction field effect transistors Q4 and Q6 are connected to the gates G3 and G5. Diodes D1 and D2 are connected between the gates G3 and G5 and voltage reference source +VR1. The drain or output terminal of the field effect transistors Q3 and Q5 are connected to a reference source −VR2 by diodes D3 and D4. The gates G3 and G5 are also connected to a second voltage source +V by diodes D5 and D6, the voltage +V being substantially higher than the voltage +V1; in one example, the voltages were 5 volts for VR1 and 10 volts for V.

For simplicity, the operation of the circuit of the first channel is explained. It is understood that the operation of the second and additional channels is identical.

Under normal conditions, the field effect transistor Q4 serves to keep the voltage between the gate of transistor Q3 and source substantially near zero whereby the channel is open. It will be apparent that the field effect transistor Q4 could likewise have its drain connected to the drain of the transistor Q3 to maintain the voltage between the gate and associated drain at substantially zero thereby keeping the channel open. In either event under normal conditions, the field effect transistor Q3 is on and has a relatively low resistance between its source and drain electrodes S3 and DR3 so that normal signals are transmitted to the output terminal 17 with substantially no attenuation.

If the input voltage at the terminal S1′ goes into a positive overvoltage condition, the diode D1 becomes forward biased and clamps the gate G3 of field effect transistor Q3 to the reference voltage VR1 plus the voltage drop of the diode D1. By way of example, in one circuit the reference voltage might be 5 volts and the gate clamped to 5.6 volts. If the overvoltage is high, in the example greater than 10 volts, the output of field effect transistor Q3 and thus the multiplexer input at the terminal 17 is limited to a voltage approximately equal to the pinch-off voltage of the field effect transistor Q3 plus the gate voltage of 5.6. By designing the field effect transistor to have a pinch-off voltage $V_p$ of less than a predetermined voltage, say 4.4 volts for the example under discussion, the output at 17 will not rise above the body voltage +10 of the MOS-FET Q1. Thus, Q1 will not be driven into an undesirable overvoltage condition.

During the positive overvoltage conditions, the device dissipation will be approximately equal to the product of the overvoltage minus the reference voltage VR1 times the saturation current $I_S$ of the field effect transistor Q4. If, for example, an 80 volt overvoltage occurs at the terminal S1′ and the saturation current of Q4 is 60 microamps, the power dissipation will be less than 5 milliwatts. This is substantially lower than the power dissipation which would be achieved in a circuit of the type employing resistor and diode limiters.

If the input voltage goes into a negative overload condition, the diode D3 becomes forward biased and clamps the terminal S1 to −VR2 minus the voltage drop of the diode or approximately −5.6 volts. As the input goes more negative, the input current is limited to a value equal to the saturation current of the field effect transistor Q3. If Q3 has a normal on resistance of 1,000 ohms, a typical value of the saturation current may be 1 milliamp. Thus, in a negative overload voltage condition of 80 volts, the resulting power dissipation will be less than 80 milliwatts.

Figure 4:
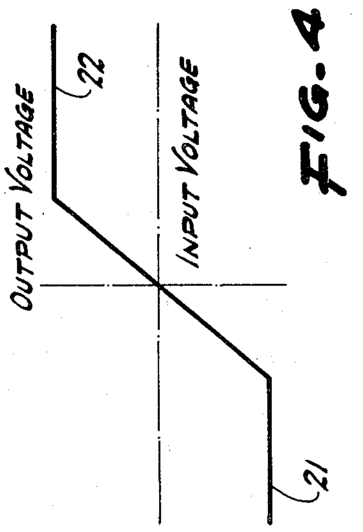
FIG. 4 shows the input-output voltage characteristics of the voltage limiter circuit shown in FIGS. 1 and 2.
Figure 3:
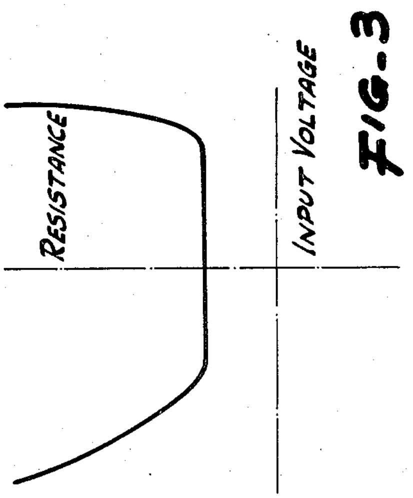
FIG. 3 shows the resistance-voltage characteristics of the voltage limiter circuit shown in FIGS. 1 and 2.

The operation of the circuit is shown by the curves of FIGS. 3 and 4. It is noted that as the input voltage increases, the resistance of the channel remains substantially constant until an overload condition is achieved, at which point the resistance increases exponentially. In FIG. 4, the output voltage as a function of input voltage is shown with the negative and positive limiting voltages at 21 and 22, respectively.

Figure 2:
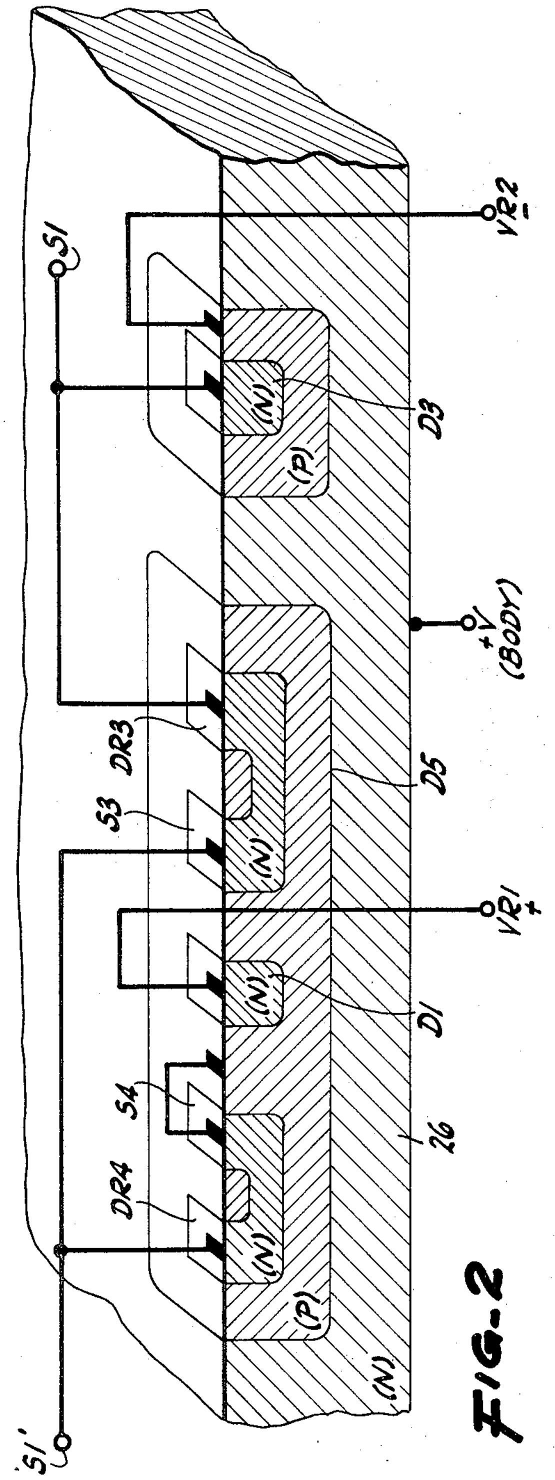
FIG. 2 is the circuit of FIG. 1 fabricated as a semiconductor integrated circuit.

As previously described, the field effect voltage limiter can be easily fabricated as an integrated circuit. It is understood that in typical applications a large number of input signals may be involved with the output associated with an equal number of MOS-FET switches. Referring to FIG. 2, there is shown a single channel voltage limiter conforming to that described above. It is to be understood that many channels can be fabricated on a single substrate 26. In the example shown, the substrate is N-type semiconductor material having P and N-type regions forming various diodes and field effect transistors. It will be apparent to those familiar with the state of the art that the various N and P-type regions may be formed by diffusion or by a combination of epitaxial growth and diffusion. Referring specifically to the figure, the diodes and junction field effect transistors carry reference designations corresponding to those described above in connection with the circuit employing discrete elements, FIG. 1.

Thus, it is seen that there has been provided a voltage limiter circuit which can be formed by simple epitaxial and diffusion techniques in a substrate as an integrated circuit or which may be a discrete circuit but which serves to protect associated apparatus from both negative and positive overload conditions with low power dissipation.

I claim:

1. A voltage limiter circuit having input and output terminals comprising a first field effect transistor having source, drain and gate electrodes with its source and drain electrodes connected in series between the input and output terminals, a second field effect transistor having source, drain and gate electrodes with its source and drain electrodes connected between the source or drain electrode of the first field effect transistor and the gate electrode of the first field effect transistor and its gate electrode to the gate electrode of the first field effect transistor, a diode having a direct current connection between the gate terminal of the first field effect transistor and a first voltage reference source.

2. A voltage limiter as in claim 1 including a second diode having a direct current connection between the drain of the first field effect transistor and a second reference voltage source.

3. A voltage limiter circuit as in claim 1 wherein said first and second field effect transistors and said diode are in the form of a semiconductor integrated circuit formed in a semiconductor substrate.

4. A voltage limiter circuit as in claim 2 wherein said first and second field effect transistors and said first and second diodes are in the form of a semiconductor integrated circuit formed in a semiconductor substrate.

5. A voltage limiter as in claim 3 wherein the gate of said first field effect transistor is connected to the substrate voltage by a diode.

6. A voltage limiter as in claim 4 wherein the gate of said first field effect transistor is connected to the substrate voltage by a diode.

* * * * *